United States Patent [19]
Ward et al.

[11] 4,176,260
[45] Nov. 27, 1979

[54] INVENTORY CONTROL SYSTEM

[76] Inventors: Theodore W. Ward; Danny W. Ward, both of 2314 S. Central, Oklahoma City, Okla. 73129

[21] Appl. No.: 797,324

[22] Filed: May 16, 1977

[51] Int. Cl.² .............................................. B65H 3/04
[52] U.S. Cl. .................................... 235/475; 198/699; 271/124
[58] Field of Search ................ 235/61.11 E, 61.11 R, 235/475, 483, 484; 271/121, 124, 167; 198/699, 698

[56] References Cited
U.S. PATENT DOCUMENTS

| 650,410 | 5/1900 | Morin | 271/125 |
|---|---|---|---|
| 2,540,266 | 2/1951 | Johnson, Sr. | 198/699 |
| 2,553,234 | 5/1951 | Boucher | 198/699 |
| 3,869,117 | 3/1975 | Yoshimura | 271/182 |
| 3,874,652 | 4/1975 | Bilbrey | 271/124 |
| 3,973,668 | 8/1976 | Stansfield | 198/698 |

Primary Examiner—Vincent P. Canney
Attorney, Agent, or Firm—Robert M. Hessin

[57] ABSTRACT

Method and apparatus for central inventory control as particularly adapted for retail vending wherein all merchandise is made to carry a coded identifier ticket characteristic of the product. Upon sale of the product the identifier ticket may be removed and at periodic times all accrued identifier tickets can be processed through a label sorter and reader to compile data for input to a central computer which then provides various forms of inventory readout to the user entity. More particularly, the invention utilizes a form of identifier ticket adapted for gummed adhesion and tear-off from the product, and the removed identifier ticket is then processed in a sorting and reading apparatus to provide recorded as well as instantaneous output for input to an associated computer or other peripheral equipment. The ticket sorting apparatus consists of a hopper portion to receive tickets in bulk for subsequent mechanical feeding into a separating track after which the individual identifier tickets bearing binary coded digital marking are optically read with output data provided for computer usage. The separating track consists of an elongated belt conveyor, of critical width to accommodate identifier tickets, which includes a serially arranged plurality of separating flanges arrayed therealong to control passage of single identifier tickets therealong. Finally, after optical reading of the identifier tickets they are dropped into a common depository for collection, storage, etc.

10 Claims, 9 Drawing Figures

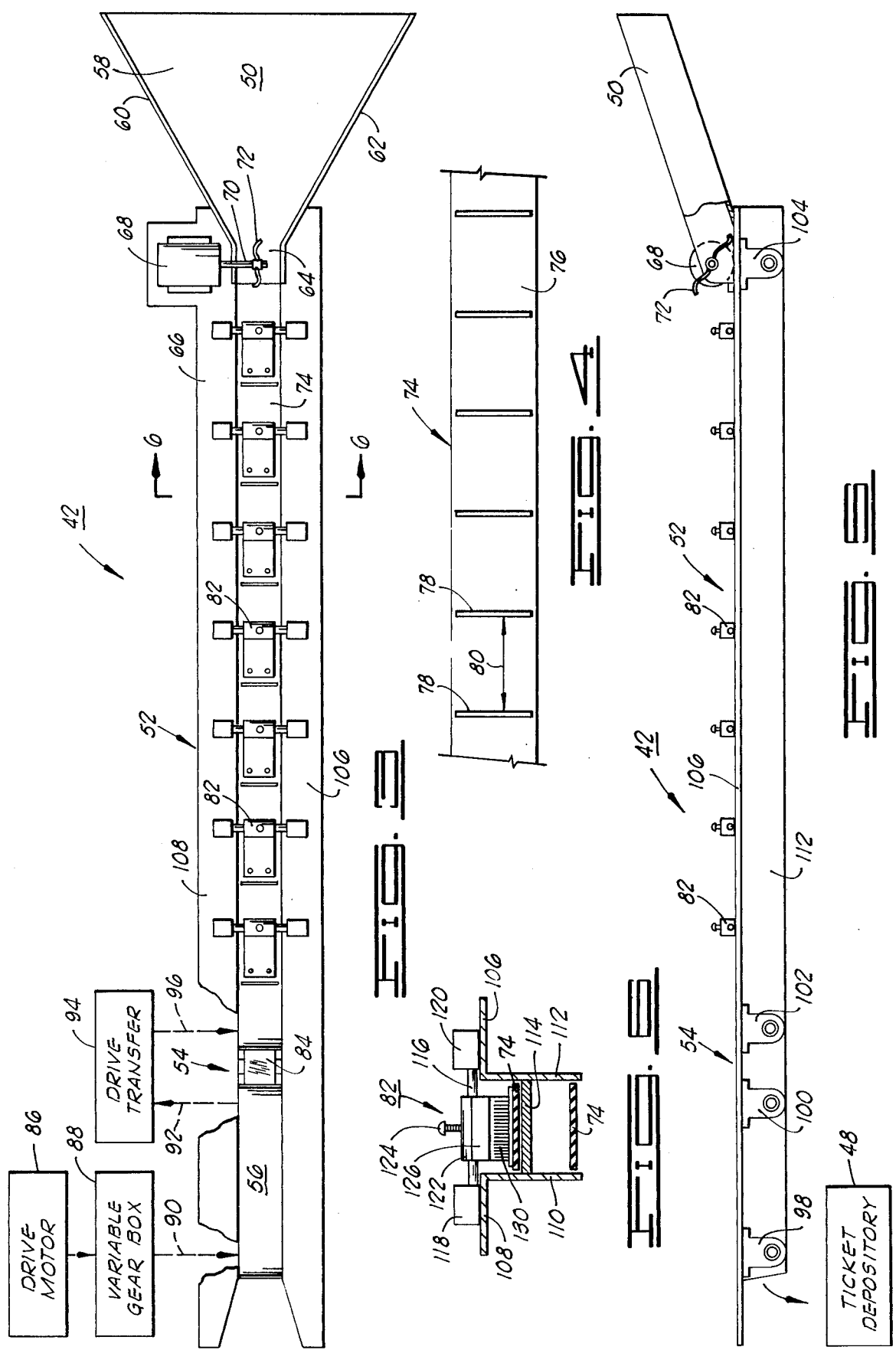

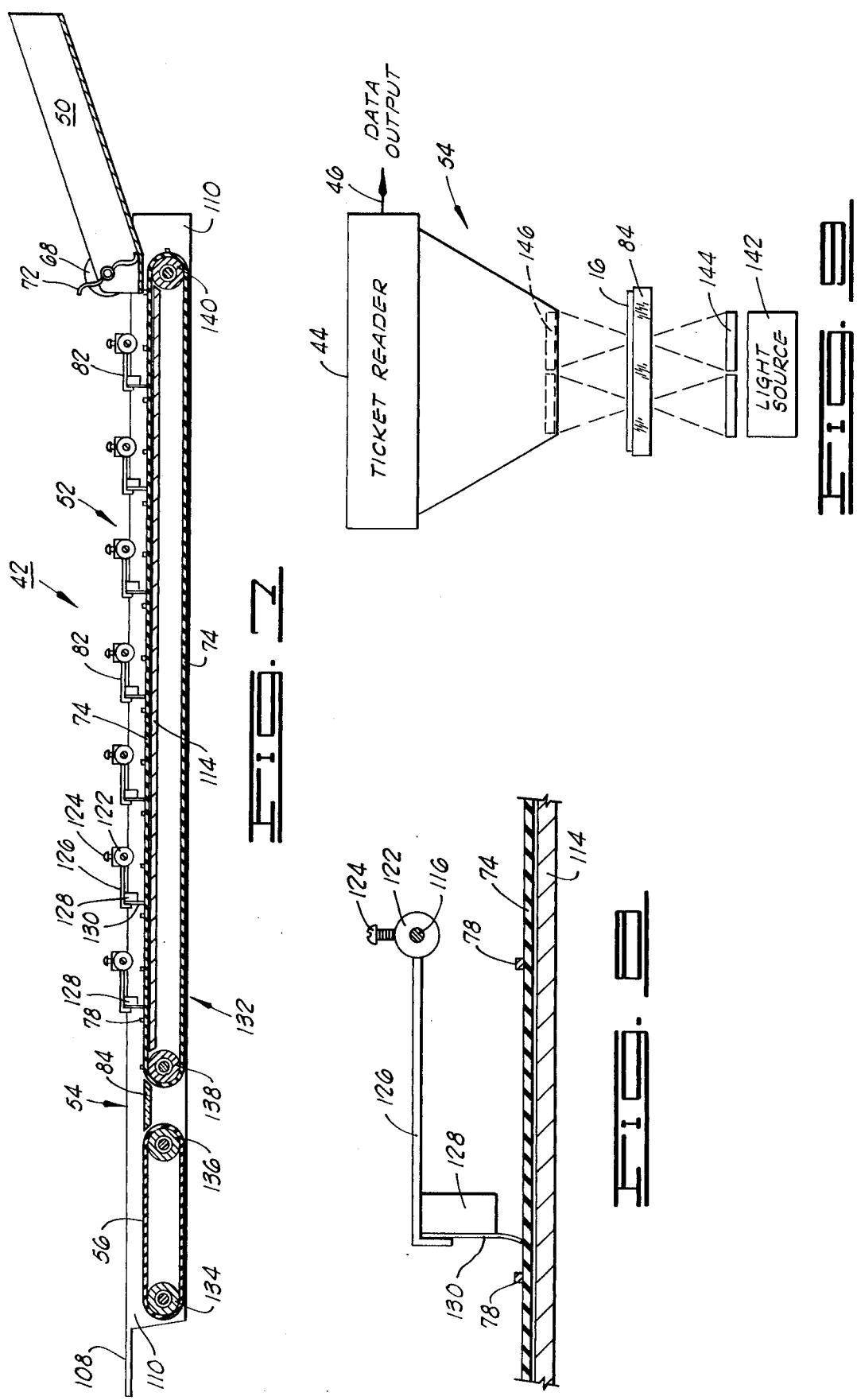

INVENTORY CONTROL SYSTEM

BACKGROUND OF THE INVENTION

1. Field of the Invention

The present invention is directed to method and apparatus for retail business inventory and, more particularly, the invention is directed to an optically readable code identifier ticket and sorting apparatus for reliably reading out binary coded digital data from a large volume of tickets in much reduced time.

2. Description of the Prior Art

While optically readable coded data imprints have been available for some time on various products sold at retail outlets, Applicant knows of no such coded labeling system wherein a binary coded ticket of tear-off form is utilized for subsequent processing through ticket sorting, reading and computer compilation of related inventory data; and, processing is done in a manner which may be customized for an individual store owner's particular inventory usage, yet another departure from prior known systems.

SUMMARY OF THE INVENTION

The present invention relates to a customized business inventory system which utilizes optically readable bar code tickets that are readily removable upon product sale for computer processing to maintain continual inventory assessment. The bar code tickets are processed in both forms through a ticket sorting apparatus which provides serial presentation of the coded bar tickets for optical readout of data whereupon the ticket is deposited in a processed ticket depository.

Therefore, it is an object of the present invention to provide a product sales inventory system which is particularly adaptable for small business utilization.

It is also an object of the present invention to provide a business inventory system utilizing code identifier tickets and an associated ticket sorting and processing apparatus enabling continual readout and storage of business sales data and inventory status.

It is yet another object of the present invention to provide ticket sorting apparatus which enables reliable alignment and reading of such individual identifier ticket in most rapid manner.

Finally, it is an object of the present invention to provide a coded optical identifier ticket which is suitable for application to a product or packaging at the time of shelf stocking or the like, and which can be removed for compatible handling in associated identifier ticket sorting and reading apparatus to provide inventory data output to a central computer and/or peripheral storage media.

Other objects and advantages of the invention will be evident from the following detailed description when read in conjunction with the accompanying drawings which will illustrate the invention.

BRIEF DESCRIPTION OF THE DRAWINGS

FIG. 3 is a top plan view of a ticket sorting apparatus constructed in accordance with the present invention;

FIG. 4 is a plan view of a conveyor belt as used in the sorter apparatus;

FIG. 5 is a side elevation of the ticket sorting apparatus of FIG. 3;

FIG. 6 is a section taken along lines 6—6 of FIG. 3;

FIG. 7 is a vertical section taken along the central axis of the ticket sorting apparatus of FIG. 3;

FIG. 8 is an enlarged view in vertical section of a sorting lever as shown in FIG. 7; and FIG. 9 is a diagram of an optical reading station as may be used in the sorting apparatus of FIG. 3.

DETAILED DESCRIPTION OF THE INVENTION

Figure 1:
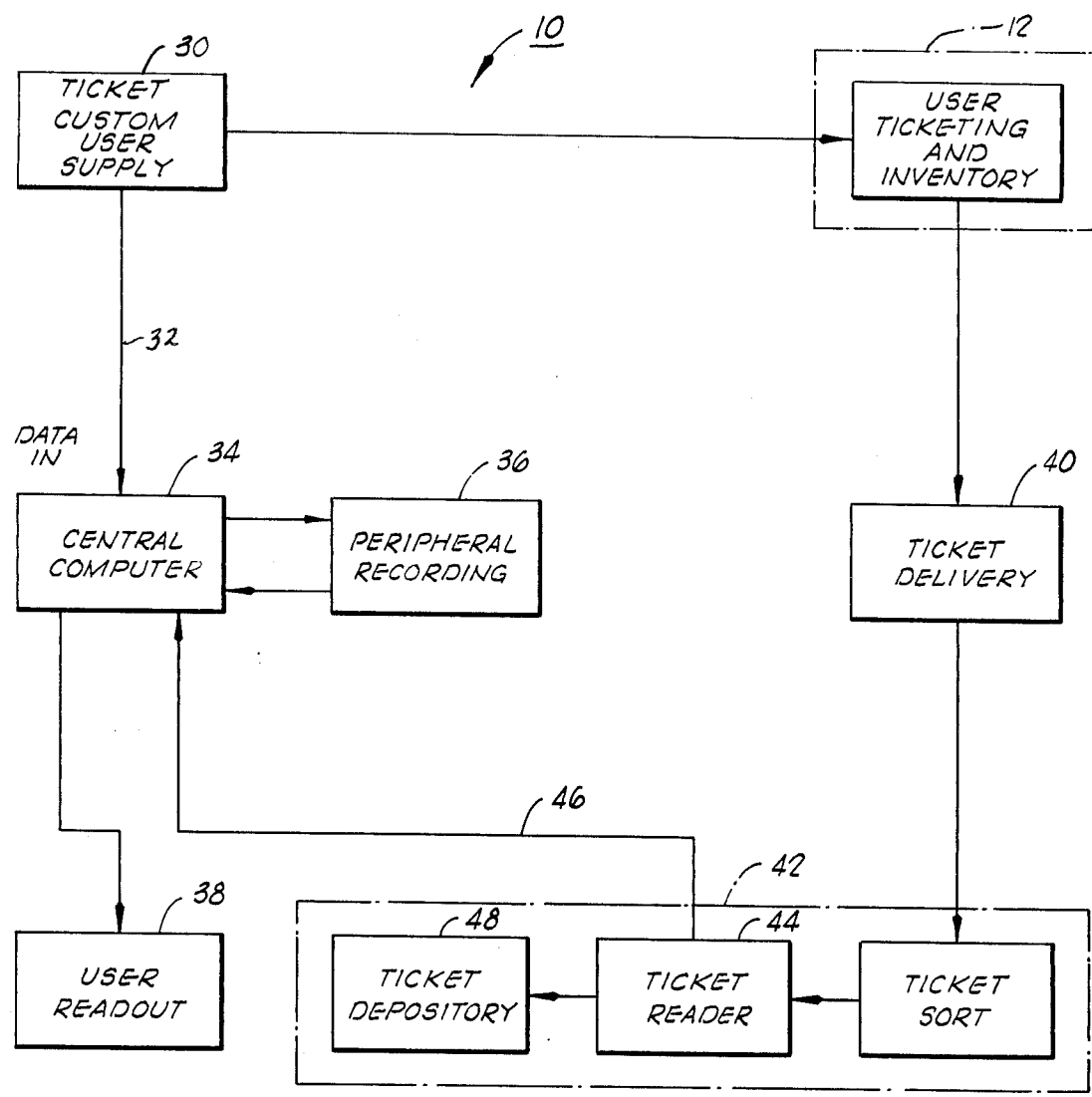
FIG. 1 is a block diagram showing the method of ticket handling, reading and data storage in accordance with the present invention.

FIG. 1 illustrates in flow form the method and steps for utilizing the inventory control system. Thus, the inventory control system 10 serves to aid the owner or operator of business 12 while providing complete and continual control of stock inventory. It is now contemplated that business 12 will be any of various types of retail outlet, but the system is applicable at any sales level. First institutions of the inventory control system have been with the automobile parts business and, as may be seen from FIG. 2, certain descriptions will be so oriented.

Figure 2:
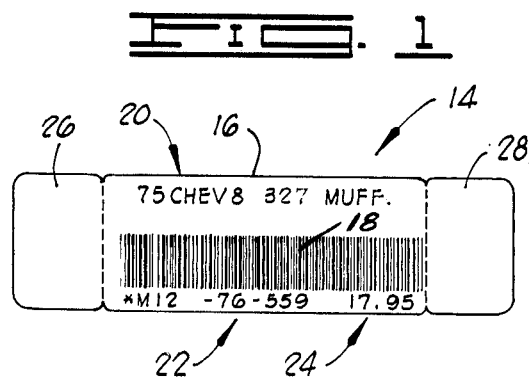
FIG. 2 is a plan view of a bar code identifier ticket constructed in accordance with the present invention.

The user or business 12 will first take inventory of his store to enable production of his particularly required store of optical bar code tickets 14 as shown in FIG. 2. The optical bar code tickets are of an attachable type wherein a central ticket 16 includes the bar code 18, part description 20, stock number 22 and, if desired, current price 24. The central ticket 16 of bar code ticket 14 has no gummed backing as this is only applied on the rear side of perforated tabs 26 and 28. Thus, the user can stick on the code identifier 14, on the merchandise it applies to, while on the shelf and then tear-off the central ticket 16 upon sale for subsequent accounting procedure, as will be further described.

Referring again to FIG. 1, once the user has decided to use the system and has listed the pertinent data relative to his inventory, the bar code tickets 14 are printed out at the ticket custom user's supply 30, and supplied to the user for marking all of his merchandise with the appropriate tickets 14. At the same time, the digital data compiled in marking up the optical bar code tickets for user 12 is suitably stored as by magnetic tape recording or the like for introduction via line 32 to the central computer 34. Central computer 34 is a general purpose type having the requisite peripheral recording 36 and user readout devices 38 as required in accordance with volume of data, number of users, etc. Thus, inventory data in accordance with digital bar code from business 12 is also in storage relative to central computer 34 once the business 12 is on system and marking merchandise with bar code tickets 14.

In present installation, the central computer 34 is a Centurion IV as commercially available from Warrex Computer Corporation of Dallas, Tex. This computer includes disk drive, central processing unit, video terminals and printer. The processor has a memory capacity which is expandable up to 65 K-bytes, MOS random access, memory parity and real time clock. User readout 38 may be effected at the central video terminal of the computer system, or it may be printed out for dispatch to the user location as business operations prefer.

Moving again to business 12, the user will tear-off center ticket 16 of each bar code ticket 14 (FIG. 2) upon sale of each item with deposit of the center ticket 16 in a safe place for periodic delivery of all tickets to the processing station as indicated by ticket delivery stage 40. Upon delivery of the tickets they are then sorted and read in ticket processing apparatus 42, as shown in FIGS. 3 et seq., with output of optically read bar code data from ticket reader 44 via line 46 to the central computer 44. The optical ticket reader 44 may be any of several commercially available devices, and one presently utilized is known as the SCANMARK available from Markem Corporation of Keene, N.H. This ticket reader reads out the optical bar code in proper digital format for direct application and acceptance by the central computer 34. After ticket reading, the center tab 16 operates in a ticket depository 48 wherein used tickets may be saved for reasons peculiar to the business, but record is retained of their existence and purpose in any event.

FIG. 3 illustrates the sorting/reading device 42 as it includes a hopper 50 for receiving incoming ticket center tabs 16 for sorting and alignment conveyance along a separating track 52 that leads to an optical reading station 54 and deposit conveyor 56. The hopper 50 consists of an inclined portion 58 having opposite angular sides 60 and 62 which direct ticket tabs to a central throat portion 64. Also positioned at the throat portion 64 as mounted on frame 66 is a variable speed sorting motor 68 extending rotary shaft 70 and relatively stiff rubber fingers 72 into the sorting area. Rubber fingers 72 when rotated tend to move the centered ticket tabs 16 onto the separating conveyor 74 for further separation and movement toward optical reading station 54. The speed of motor 68 can be varied by the operator in accordance with the volume of input tickets, greasy or sticking conditions and the like.

The separator conveyor 74, as shown in enlargement in FIG. 4, consists of a suitable resilient, rubberized belt 76 having transverse strips 78 bonded thereon in uniform spacing 80 which is slightly larger than the length of a center ticket 16. Thus, as tickets proceed along the separating conveyor 74 they tend to fall individually into one of the spacings 80 between two adjacent overlay strips 78. Also aiding in the ticket separation function along separation conveyor 74 are a plurality of individually adjustable separating finger assemblies 82, as will be further described. Separated tickets then arrive at optical reading station 54 whereupon they pass over optics plate 84, are digitally read out with data transmission to the central computer, and are then carrier by deposit conveyor 56 to ticket depository 48.

A drive motor 86 operating through a variable gear box 88 provides primary power to the sorter assembly 42. In present design, a Dayton ½ horespower motor, model 2M145, is employed and the variable gear box 88 is controllable between 25 and 200 revolutions per minute. Rotational output from variable gear box 88 is then applied via rotary linkage 90 to drive deposit conveyor 56. At the opposite end of conveyor 56, the same rotational drive is taken off via rotary linkage 92 and applied to a suitable rotary drive transfer 94 for re-application by rotary linkage 96 to drive the separator conveyor 74. As shown more particularly in FIG. 5, the rotary drive elements are supported by a commercially available self-aligning bearing, Borg-Warner Type LP-112, and bearings 98 and 100 support the deposit conveyor 56 for rotation as well as transmission of rotary drive, while bearing 102 and 104 support the separator conveyor 74. The bearings 98-104 are simply secured under the frame apron panel 106 in proper position, and four additional bearings of the same type are similarly located on the other side as supported beneath frame panel 108 (See FIG. 3).

Referring now to FIG. 6, the two opposite sides of frame 66 (FIG. 3) are formed of right angular structures consisting of top panel 108 and side panel 110 on one side and top panel 106 and vertical side panel 112 opposing. A transverse support plate 114 is then secured as by welding between side panels 110 and 112 along the length of frame 66 in order to support the conveyor belt 74 along the extent. As also shown in FIG. 6, the plurality of separating finger assemblies 82 are each adjustably secured on a support rod 116 as supported between blocks 118 and 120 which are secured as by welding to the respective frame side panels 108 and 106. The finger assembly 82 is rotationally supported by a block portion 122 supported on rod 116 and which can be rigidly affixed by means of a securing screw 124. The details of separating finger assembly 82 are also evident in FIGS. 7 and 8 where it can be seen that the block portion 122 extends a lever arm 126 to which are affixed a securing pad 128 maintaining a rubber brush 130 in operative alignment with the upper surface of separator conveyor 74. The rubber fingers 130 are merely made up of a section of rubber as secured between securing pad 128 and the end of finger 126 with the lower extending portion repeatedly slit to provide a brushing action as against center tab tickets 16 passing along separator conveyor 74.

There are included seven such separating finger assemblies 82 in series and this has proven to be a number satisfactory for efficiently separating all center tab tickets 16 entering into separator conveyor 74. That is, when one, two or more tickets may enter the conveyor in stacked array, their passing through the successive separating finger elements 82 tend to arrange and maintain but a single ticket 16 lying between respective transverse strips 78 with a very high degree of reliability. In this manner, it is extremely reliable that each and every center tab ticket will be read with appropriate digital output to the central computer. In practice the individual separator finger assemblies 82 are adjusted by respective set screws 124 so that securing pads 128 are successively closer to the upper moving surface of separator conveyor 74 as you progress along the conveyance, and such adjustment results in an alignment whereby the last separator finger assembly 82 at position 132 is set so that the securing pad 128 will barely allow clearance of the separator conveyor 74 and transverse strips 78.

Also shown in FIG. 7, is the interior pulley arrangement showing transverse pulleys 134 and 136 moving deposit conveyor 56, the pulley 134 receiving input rotational drive as applied from rotational link 90 (FIG. 3). Similarly, drive transfer is affected from pulley 136 with transfer input to a pulley 138 which, in concert with a pulley 140 provides driven support for the separator conveyor 74.

As tickets are moved past the optical reading station 54 across optical plate 84 they are read out by a commercially available form of optical reader. FIG. 9 illustrates one form of ticket reader 44 wherein alternative output is enabled so that no matter which way the center tab 16 progresses across optical plate 84, it will be read. That is, since digital bar code is only printed on one side of the ticket 16, the machine has the capability of reading either side as it passes through the optical field of view. The reading station 54 requires merely a standard form of uniform light source 142 and suitable directing optics 144, to direct the light through the support optics 84 and the printed bar code on ticket 16 to the sensor apparatus 146 within ticket reader 44. The structure and operation of such optical ticket reading apparatus is well-known in the art and commercially available, as before described, and the equipment utilized in the present invention provides data output on lead 46 which is properly formatted for entry and acceptance at the central computer 34 for processing and storage of pertinent data.

In operation, the present invention enables an efficient and economical way for numerous types of small business retail outlets to maintain continual record of inventory and updated accounting of business conditions. A central agency supplying the central computer service can supply the bar code tickets in customized manner to account for all retail sales items of the particular business. After the business user labels his goods and maintains diligent center tab ticket collection for submission to the central agency, the business user has the capability of continually updating his inventory information, and he can also obtain printed readout showing such conditions.

Initially, the business user need only take inventory of his store merchandise and thereafter attach a bar code inventory control ticket (FIG. 2) to each and every piece of merchandise in accordance with proper identification. When a piece of merchandise is sold, the ticket is removed and dropped in a lock box or other repository subject to periodic removal and dispatch to the central sorting and computing agency. Using the ticket 16 data, the central processing agency can enter customer cost, stock numbers and other numerical data in the memory of the computer to enable the business user to receive a printout indicating gross profit on all sales at the end of selected periods of time, e.g., weekly or monthly.

The central agency can control retail sales only, if so desired, and thereafter give the user business an exact list of all merchandise sold by listing manufacturer and stock number; or the agency can control all inventory in and out by receiving packing slip information. The latter course can be accounted for by either the business user or the central agency by entering the pertinent information on cassette as may be keyed from the computer terminal. The central agency can pick up ticket information and deliver new substitute tickets for like merchandise by courier or mail, and this service can be rendered either daily, weekly or at any period as depends upon the needs of the user. Further, after a history of inventory movement and replacement is established, the central computer is able to write orders for the business user and rapidly furnish such written orders within hours.

The present system in simplest form is able to control movement by merely having a starting inventory and thereafter recording movement of merchandise. A small business user then has at hand the information needed to dispose of merchandise which is not selling and is therefore able to place his investment in merchandise that sells. In effect, the central computer radout provides a picture of all merchandise, that which is sold as well as that which is not sold.

At periodic intervals, for example year end or the like, the central computer can provide a printout of complete inventory, thus obviating the necessity for time consuming manual inventory of the user business.

The inventory can be cost extended and priced if so desired, and it will be correct and up to date to the extent that cursory sport check or shelf count will indicate any possible shrinkage figure. Additionally, the present inventory control system will apply to either a FIFO or LIFO procedure and give exact inventory figures. Still further, the central computer can offer complete accounting figures with entry of payment or disbursement data on cassette tape as keyed for input to the computer. Such information for each individual business user can be periodically entered on disks for that particular user, and such further capability multiplies the capacity of the computer and reduces the cost to individual business users.

Changes may be made in the combination and arrangement of procedures as heretofore set forth in the specification and shown in the drawings; it being understood that changes may be made in the embodiment disclosed without departing from the spirit and scope of the invention as defined in the following claims.

What is claimed is:

1. In a system of business stock inventory accounting, coded item ticket sorting apparatus, comprising:
   means for receiving a plurality of said item tickets and directing flow of such tickets to a constricted area;
   rotational drive means and resilient finger means contacting said item tickets for moving said item tickets through the constricted area in reduced quantity;
   channel means receiving said item tickets from the constricted area and conveying said tickets linearly along a narrow channel that is approximately as wide as said item tickets;
   plural contacting means disposed along said narrow channel to contact said item tickets passing thereby to insure passage of but a single item ticket at a time in emergence from said narrow channel;
   transparent plate means that is smaller in length than said item tickets receiving said tickets thereacross upon emergence from said narrow channel; and
   deposit conveyor means carrying said item tickets away from said transparent plate means.

2. Apparatus as set forth in claim 1 which is further characterized to include:
   code reading means for examining each item ticket passing over said transparent plate means and generating a characteristic electrical read output.

3. Apparatus as set forth in claim 1 wherein said channel means receiving comprises:
   frame means defining said channel of pre-set length and having the width approximating that of said item tickets; and
   conveyor means of endless belt type disposed to run through said channel to said transparent plate means.

4. Apparatus as set forth in claim 3 which is further characterized in that:
   said endless belt is a resilient belt having a plurality of transverse strips bonded thereacross at regular spacings each approximating said item ticket length thereby to capture and accommodate a single item ticket for movement along said channel.

5. Apparatus as set forth in claim 1 wherein each of said plural contacting means comprises:
   contacting lever means disposed in alignment over said narrow channel;
   support means affixed over said channel and having one end of said contacting lever connected thereto, said support means being adjustable to vary the angle of said contacting lever relative to said channel means; and resilient contacting means affixed to the remaining end of said contacting lever for interfering contact with passage of more than a single item ticket within unit channel space.

6. Apparatus as set forth in claim 3 wherein each of said plural contacting means comprises:

contacting lever means disposed in alignment over said narrow channel;

support means affixed over said channel and having one end of said contacting lever connected thereto, said support means being adjustable to vary the angle of said contacting lever relative to said channel means; and resilient contacting means affixed to the remaining end of said contacting lever for interfering contact with passage of more than a single item ticket within unit channel space.

7. Apparatus as set forth in claim 6 which is further characterized in that:

said endless belt is a resilient belt having a plurality of transverse strips bonded thereacross at regular spacings each approximating said item ticket length thereby to capture and accommodate a single item ticket for movement along said channel.

8. Apparatus as set forth in claim 6 wherein said resilient contacting means comprises:

plural resilient finger segments secured to said contacting lever transverse to said narrow channel for adjustment to contact item tickets conveyed thereunder; and securing pad means of rigid material secured to said contacting lever and adjacent said finger segments which upon adjustment of the contacting lever varies the clearance height of item tickets conveyed therebeneath.

9. Apparatus as set forth in claim 1 which is further characterized in that:

said coded item ticket bears a light responsive digital bar code.

10. Apparatus as set forth in claim 9 wherein said coded item ticket comprises:

a rectangular ticket made of resilient material having two gummed, equal area portions at each end of the long dimension thereof with each defined by perforation, the remaining central portion of which bears said digital bar code, so that the ticket can be attached to inventory and the center portion can be removed for inventory handling.

* * * * *